US006614350B1

(12) United States Patent
Lunsford et al.

(10) Patent No.: US 6,614,350 B1
(45) Date of Patent: Sep. 2, 2003

(54) METHOD AND SYSTEM FOR EFFECTING A SECURITY SYSTEM UPON MULTIPLE PORTABLE INFORMATION DEVICES

(75) Inventors: Michael Lunsford, San Carlos, CA (US); Steve Parker, Centerville, UT (US); David Kammer, Seattle, WA (US); Nicholas A. Thomas, Orem, UT (US); David Moore, Riverton, UT (US)

(73) Assignee: 3Com Corporation, Santa Clara, CA (US)

( * ) Notice: Subject to any disclaimer, the term of this patent is extended or adjusted under 35 U.S.C. 154(b) by 436 days.

(21) Appl. No.: 09/709,166

(22) Filed: Nov. 8, 2000

(51) Int. Cl.[7] .............................................. G08B 13/14
(52) U.S. Cl. ................... 340/572.1; 340/568.1; 340/571; 340/539.11
(58) Field of Search ................... 340/572.1, 568.1, 340/571, 3.1, 5.1, 5.2, 10.1, 539.1, 539.11, 539.23

(56) References Cited

U.S. PATENT DOCUMENTS

| 4,785,291 | A | | 11/1988 | Hawthorne | 340/573 |
| 5,583,486 | A | | 12/1996 | Kersten | 340/568 |
| 5,949,335 | A | * | 9/1999 | Maynard | 340/572.1 |
| 6,002,334 | A | * | 12/1999 | Dvorak | 340/568.1 |
| 6,002,427 | A | * | 12/1999 | Kipust | 348/156 |
| 6,084,517 | A | | 7/2000 | Rabanne et al. | 340/573.4 |
| 6,259,367 | B1 | * | 7/2001 | Klein | 340/572.1 |
| 6,353,390 | B1 | * | 3/2002 | Beri et al. | 340/572.1 |
| 6,433,685 | B1 | * | 8/2002 | Struble et al. | 340/571 |
| 6,504,480 | B1 | * | 1/2003 | Magnuson et al. | 340/571 |
| 6,510,380 | B1 | * | 1/2003 | Curatolo et al. | 701/207 |
| 6,535,129 | B1 | * | 3/2003 | Petrick | 340/572.1 |

* cited by examiner

Primary Examiner—Nina Tong
(74) Attorney, Agent, or Firm—Wagner, Murabito & Hao LLP

(57) ABSTRACT

A method and system for effecting a security web upon multiple devices. In one embodiment of the invention, multiple devices are enabled to respond as authorized members of a security web such that each device acts as a co-monitoring device within the web. Further, each device transmits an identifiable RF signal at regular time intervals and is enabled to search for the transmitted RF signal from every other device within the security web. Next the invention determines a non-authorized loss of proximity from the web of any of the devices of the web. Upon determining a non-authorized loss of proximity of any device, the invention provides for at least one of the devices of the web to initiate an event.

30 Claims, 11 Drawing Sheets

METHOD AND SYSTEM FOR EFFECTING A SECURITY SYSTEM UPON MULTIPLE PORTABLE INFORMATION DEVICES

FIELD OF THE INVENTION

The present invention relates to security systems and the prevention of computer theft. More particularly, the present invention pertains to a method and system for effecting a security system upon multiple portable information devices.

BACKGROUND OF THE INVENTION

The type and variety of compact and lightweight portable information devices (PID's) has burgeoned in recent years. The availability of these items to the average consumer has placed tens of thousands into use and into all aspects of one's business life and daily life. The presence of these devices has become common in the home and office, on the streets, in shops and restaurants, and in places of travel. The development of new devices and the creation of hybrids of previously existing devices will undoubtedly cause their numbers and prevalence to continue to grow.

Portable communication and computing devices have evolved rapidly and substantially. Wireless communications systems have grown from the analog systems used mainly by the military and the police to the various forms of analog and digital wireless communications available today. The devices which support these communications have evolved from the heavy and bulky portable radios used by the military, to the relatively large walkie-talkie units developed in the 1960's, to the compact and lightweight cellular phones and pagers being used today. Portable computers, first introduced in the 1980's, have developed into ever smaller form laptop computers. and these have been followed by the creation of the handheld Personal Digital Assistant (PDA).

Recently various wireless communications protocols, such as the Bluetooth, WAP (Wireless Application Protocol), Home RF (Home Radio Frequency), HiperLAN (Hiper Local Area Network), I.E.E.E. (Institute of Electrical and Electronics Engineers) 802.11a and 802.11b protocols, have been developed to provide standardized methods for establishing low-to-medium power, short-to-intermediate range radio frequency (RF) communications between RF enabled devices. The incorporation of these protocols with various electronic devices and communications applications is just beginning to be explored. Handheld organizers and wireless laptop computers are enabled to communicate remotely with the Internet. Wireless LAN's (Local Area Networks) eliminate the need for cabling devices together.

Business travelers often carry multiple personal information devices. A laptop computer may be accompanied by a separate external wireless modem. Cellular phones and/or pagers are commonly carried, and the usage of PDA's is just beginning. Families or groups of travelers may collectively carry a large number of such devices.

The availability of these devices for theft and the possibility for inadvertent abandonment is substantial. A laptop left briefly unattended in an airport becomes an easy target for theft. PDA's, pagers, cell phones and other personal electronic devices can be easily concealed and stolen or they may simply be put down by their owners, forgotten, and left behind.

Various means for providing article security and for monitoring and tracking objects are known in the art. For example U.S. Pat. No. 5,583,486 describes a three part security access system where the proximity of two units is necessary for gaining access to a secured area. Loss of proximity of the second unit relative to the first unit prevents access to the secured area and can also be cause for an alarm to be sounded by the first unit. However, the monitoring of multiple units where any one may be lost or become disabled is not taught.

In additional example U.S. Pat. No. 6,084,517 describes a system for selectively detecting the presence of a plurality of objects in proximity to a person. The approach described therein consists of the attachment of a transceiver emitting a locator signal to each of multiple "child" items in need of monitoring, and the establishment of a receiving "parent" unit for monitoring the locator signals from all the child items. Though monitoring of multiple units is addressed, the parent/child structure of this art provides for no awareness or monitoring capability between the various child items should the parent unit be removed, lost or disabled. Additionally there is no provision for additional items to be added into the monitoring scheme in a remote and automated fashion.

The growth in the widespread business and consumer use of portable information devices has created a need for a method and system to deter the theft and prevent the loss of such devices. Such a system needs to accommodate a multitude of devices and have the robustness not to be defeated by the loss or removal of any one device. It would be additionally advantageous for the system to be easily expandable so to provide for multiple users to combine their PID's under one common security system thus allowing each user to be made cognizant of a loss or theft of device by any other party. The invention described herein provides for such a method and system.

SUMMARY OF THE INVENTION

The invention disclosed is a method and system for effecting a security system upon multiple devices. The invention provides for multiple devices to respond as authorized members of a security web such that each device acts as a co-monitoring device within the web. The invention is particularly well suited for deterring the theft and preventing the inadvertent abandonment of various portable information devices such as PDA's, cellular phones, laptop computers, pagers and other personal electronic devices comprising gaming devices, digital cameras, mobile access devices, digital camcorders and mp3/walkman players.

To effect the security web each device is provided an encoded and identifiable RF transmission signal and additionally provided an accounting of all other devices within the security web and their signals. The devices are enabled to communicatively connect to every other device within the security web by way of RF signal transmission, detection and reception capabilities embedded in each device. Each device transmits an identifiable RF signal at regular time intervals and each device is enabled to search for the transmitted RF signal from every other device within the security web.

In conjunction with providing to each device originally comprising the security web an encoded and identifiable transmission signal, an authorization process allows for devices to be remotely removed from the security web and for new devices to be remotely added into the web. Devices which leave the proximity of the security web without having first removed themselves from the web's coverage, in the web authorized fashion, would be considered as having a non-authorized loss of proximity.

The security web determines a non-authorized loss of proximity from the web of any of the devices of the web and can do so in a user determined variable fashion. In one embodiment, the loss of signal from a device by at least one other device or a particular device determines the loss of proximity to the security web. In another embodiment, the non-receipt of transmission signal from a device by all other devices of the security web determines the loss of proximity to the security web. For a device not having been removed from the security web, the loss of proximity is determined to be non-authorized and the invention provides for at least one of the devices of the security web to initiate an event. Events initiated by the security web are inclusive of the sounding of alarms, the flashing of displays, the deactivation of devices, and/or any other functionality that may be available upon the device.

In another embodiment, the Bluetooth wireless communications protocol is employed upon the devices comprising the security web, wherein the devices are all Bluetooth enabled and inclusive of PDA's, cellular phones, laptop computers, pagers and other personal electronic devices comprising gaming devices, digital cameras, mobile access devices, digital camcorders and mp3/walkman players. Although the Bluetooth Link Management structure is of a Master/Slave type structure, the security system effected is of a device co-monitoring, web type structure. Upon the loss of a Bluetooth Link Management Master, one of the remaining members of the security web immediately reestablishes the security web and acts as the new Link Management Master.

BRIEF DESCRIPTION OF THE DRAWINGS

The operation of this invention can be best visualized by reference to the following drawings described below.

DETAILED DESCRIPTION OF THE PREFERRED EMBODIMENTS

Described in detail below is a method and system for effecting a security system upon multiple portable information devices. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Within the various embodiments of the invention, the primary structure of the security system effected is that of a web where each device is enabled to communicate with and monitor every other device intended to be within the security system. The security system is thereby not defeated should any device be stolen, lost or disabled. Additionally the web structure of the invention allows for devices to be added and subtracted remotely as desired. Examples of the invention employing the security web structure are shown in FIGS. 1a through 3 and are described below.

Figure 1A:
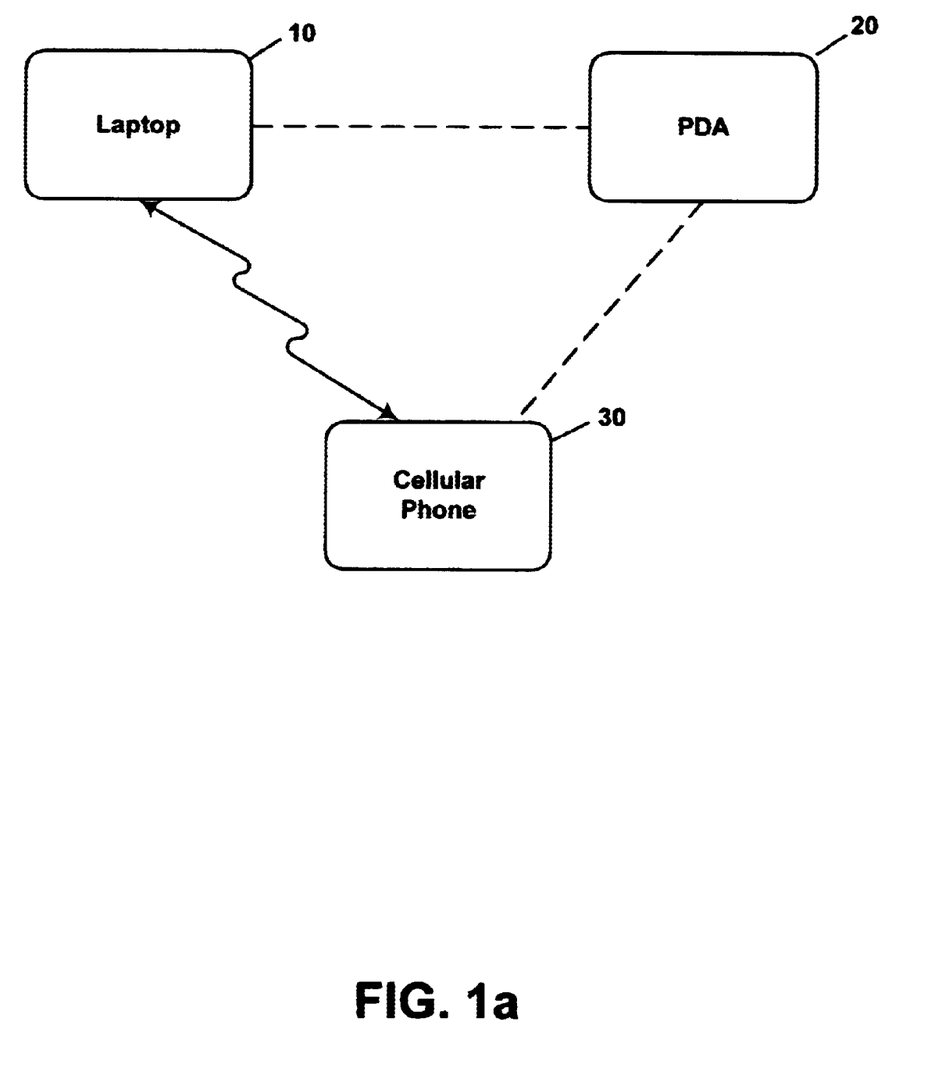
FIG. 1a is a block diagram depicting a security system effected upon a laptop and a cellular phone in accordance with an embodiment of the invention.
Figure 1B:
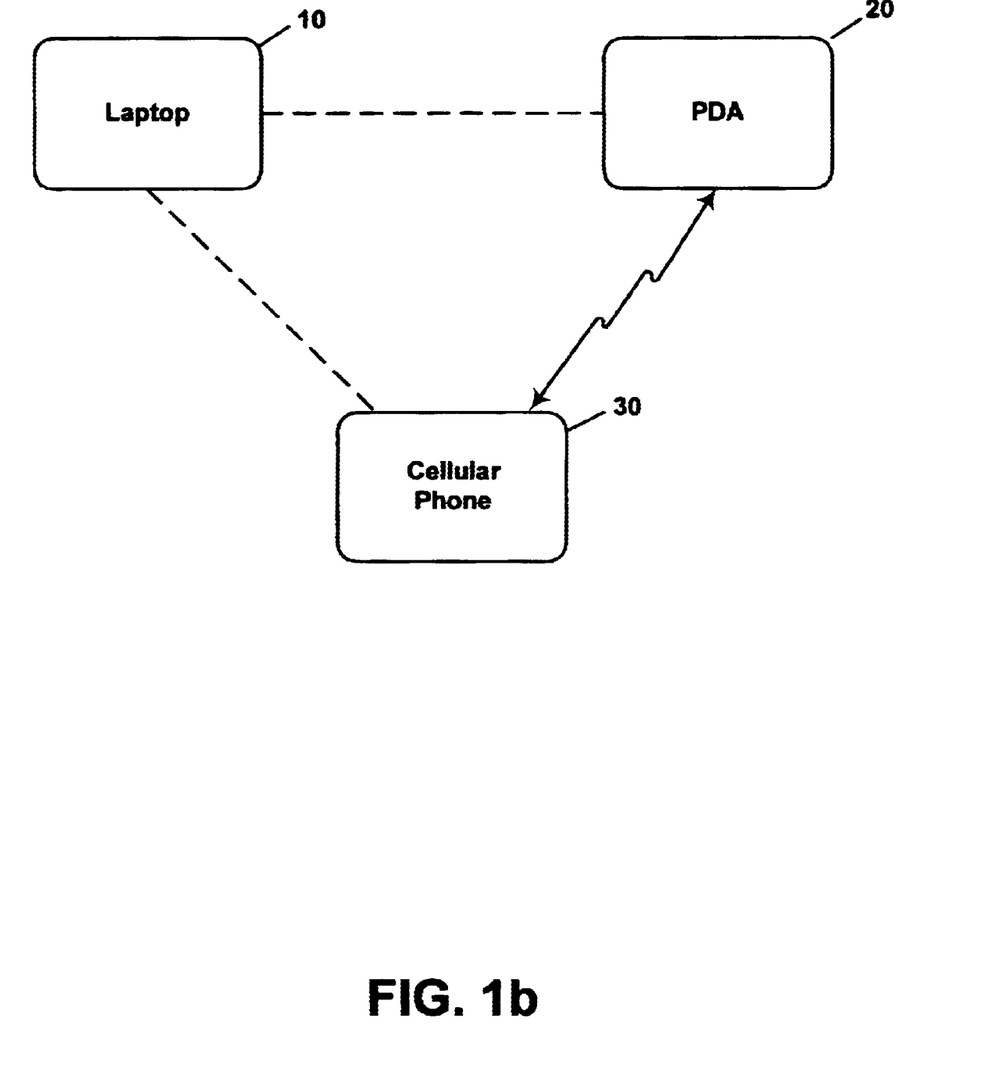
FIG. 1b is a block diagram depicting a security system effected upon PDA and cellular phone in accordance with an embodiment of the invention.

FIGS. 1a and 1b depict two embodiments of the invention where a security system is initially effected upon two portable information devices. In FIG. 1a a laptop computer 10 and a cellular phone 30 are in RF communication and act as co-monitoring devices for each other so either or both would initiate an event, such as the sounding of an alarm, should proximity be lost between the two devices. Each device is enabled to monitor additional devices such as a PDA 20 should it be wished for the PDA to be added to the security system. In FIG. 1b the cellular phone 30 and the PDA 20 are in RF communication and act as co-monitoring devices to effect a security system for the two devices and each is enabled to monitor additional devices such as the laptop 10 should it be wished for the laptop to be added to the security system. Within the scope of the invention, a security system could also be effected where the laptop 10 and PDA 20 are co-monitoring devices and wherein each are capable of monitoring an additional device such as cellular phone 30.

Figure 2:
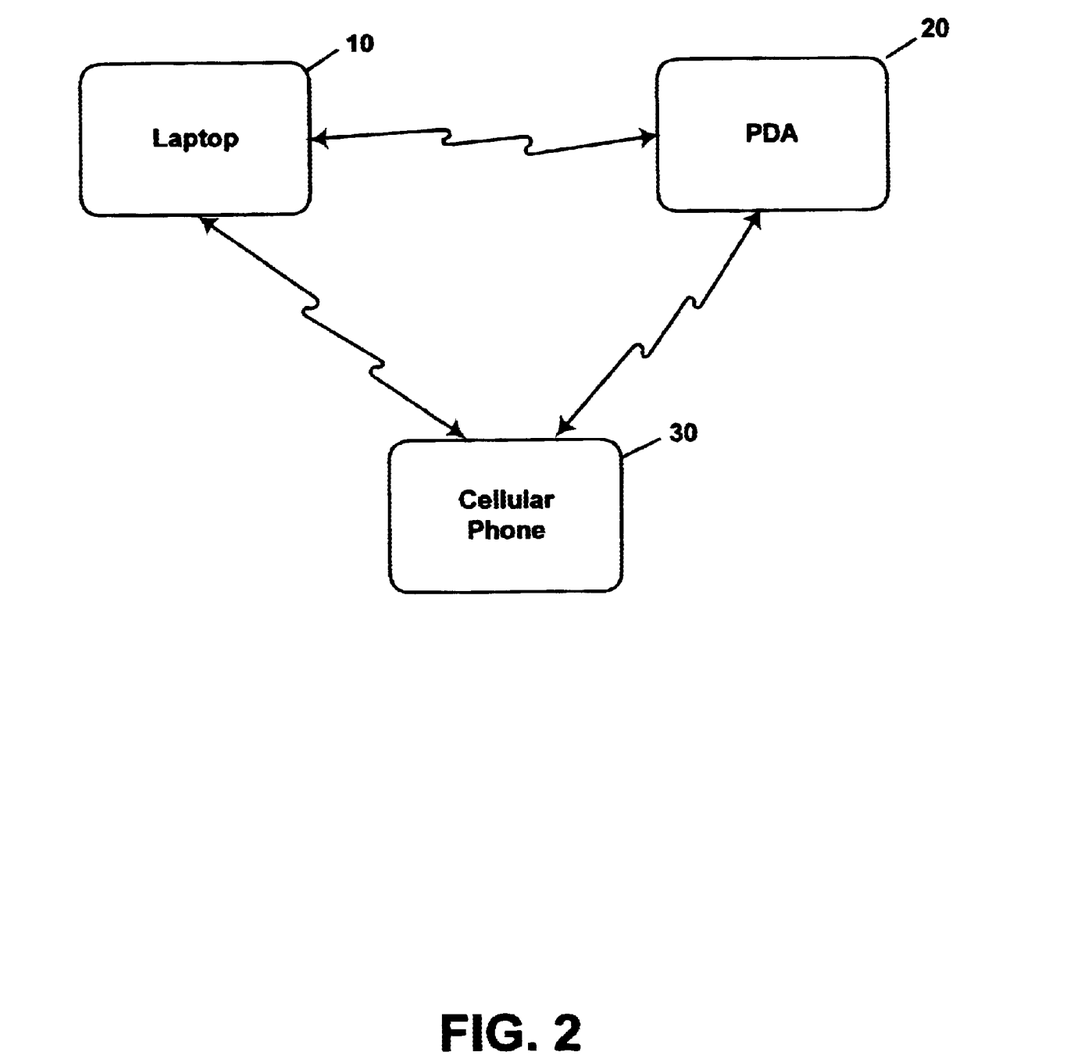
FIG. 2 is a block diagram depicting a security system effected upon three portable information devices in accordance with an embodiment of the invention.

FIG. 2 depicts an embodiment of the invention where the three devices of FIGS. 1a and 1b are all included in the security system. Laptop 10 is in RF communication and enabled to monitor both PDA 20 and cellular phone 30. Likewise PDA 20 monitors cellular phone 30 and laptop 10, and cellular phone 30 monitors PDA 20 and laptop 10. Should any device be lost, stolen, disabled, or simply removed from the web, then the security system would be maintained over the two remaining devices.

Figure 3:
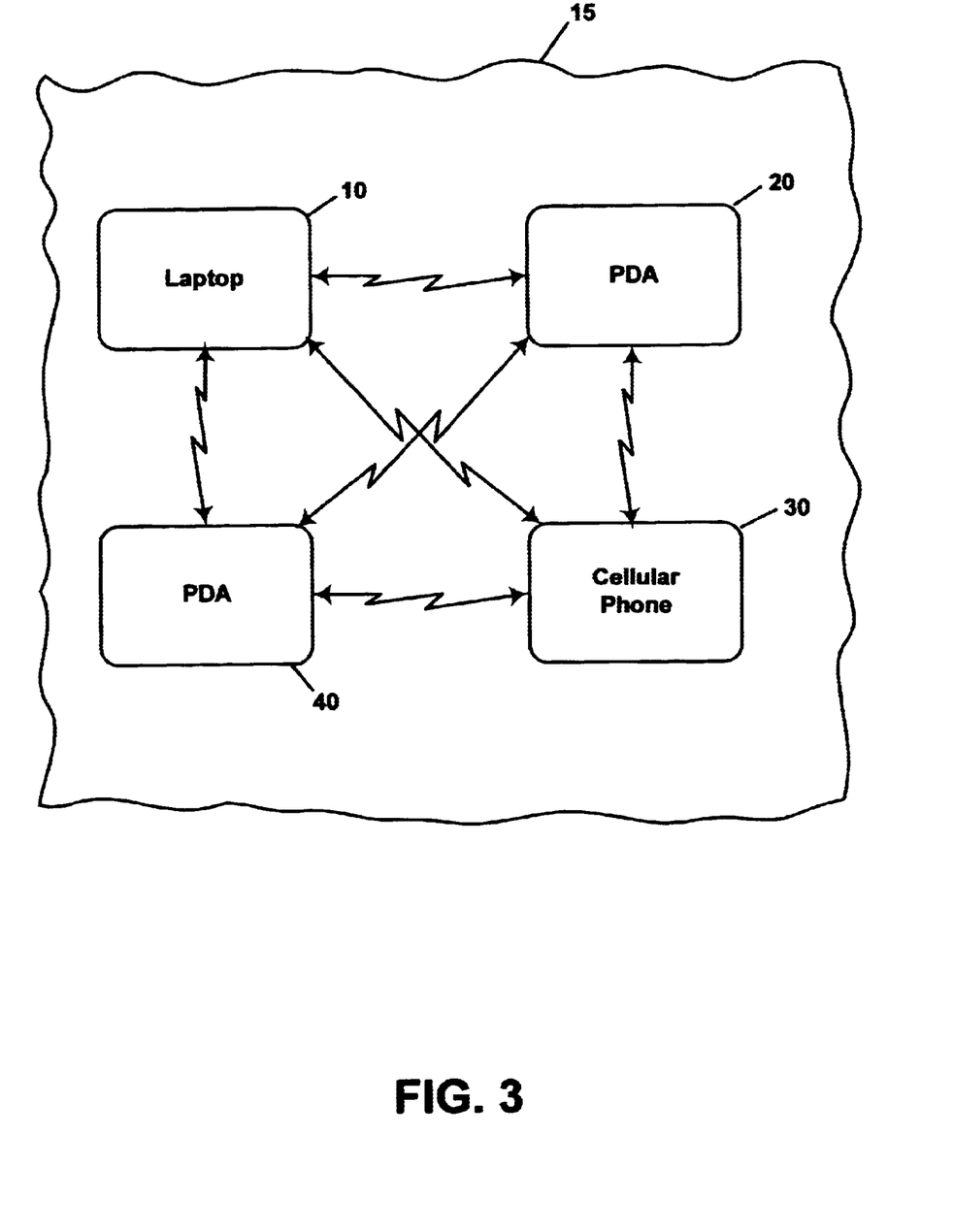
FIG. 3 is a block diagram depicting a security system effected upon four portable information devices in accordance with an embodiment of the invention.

The invention provides for additional devices to be added and subtracted to an existing security web in a web authorized fashion. FIG. 3 depicts an embodiment of the invention where the security web of FIG. 2 covering the laptop 10, PDA 20, and cellular phone 30 has been joined by an additional device PDA 40, together forming a security web 15. In FIG. 3 it is seen that each device is in RF communication with every other device. It is to be appreciated that this security web could have been effected in various scenarios, including the scenario where all four devices are covered at the initiation of the security web.

Additionally, it is provided that two security webs may be communicatively linked by at least one of any one device of the first web to at least one of any one device of the second web to form one security system over the linked security webs. This type of security system structure may be advantageous where the two security webs, being distinct and pre-existing security systems, wish to share security functions and thus provides for the devices of each security web to be aware and enabled to initiate an event at the loss of proximity of any device from the other security web. This type of security system structure may be necessary for covering a multitude of devices where the total number of devices cannot all be accommodated within one security web due to limits of devices or communications protocols.

Figure 4:
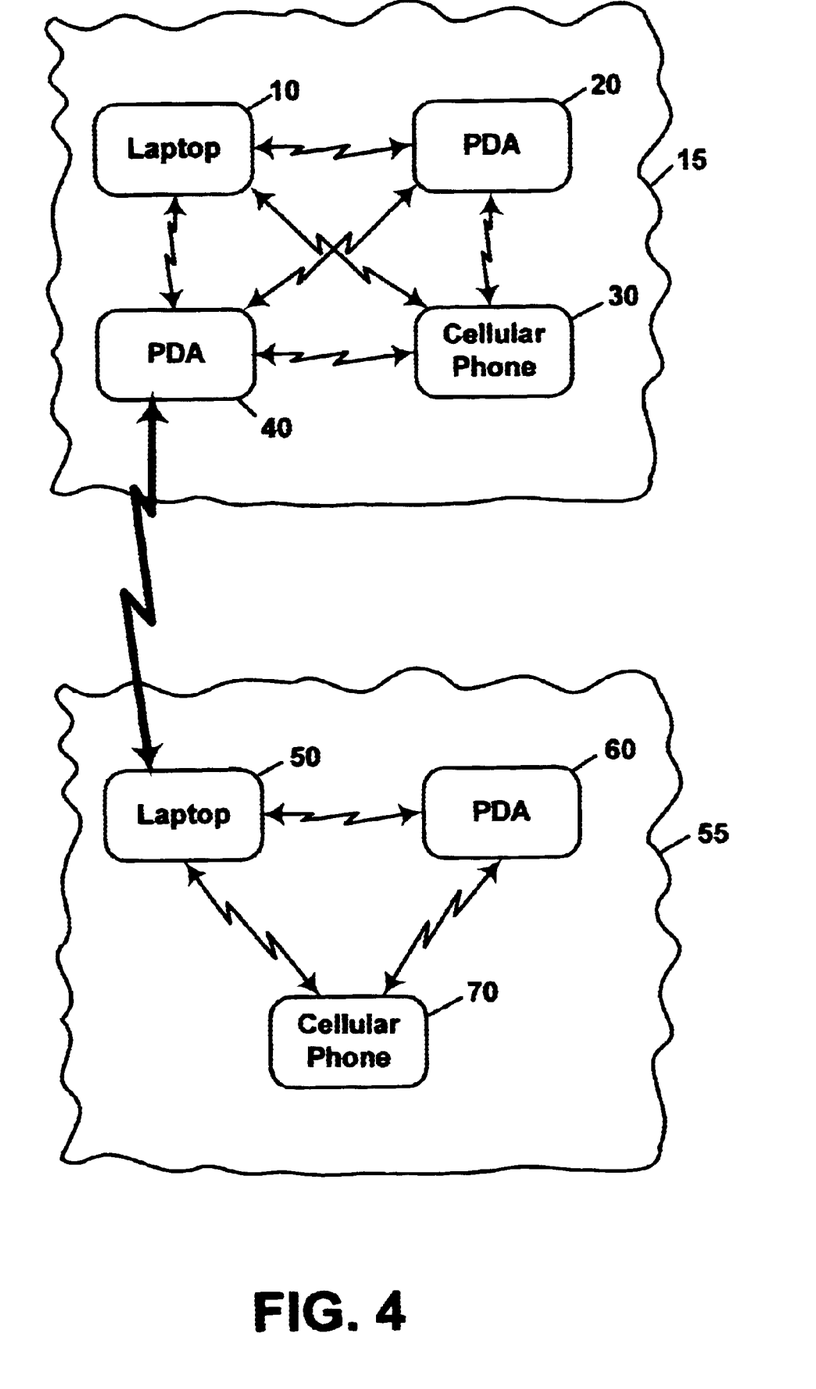
FIG. 4 is a block diagram depicting a security system effected upon two linked security webs in accordance with an embodiment of the invention.

FIG. 4 depicts an embodiment of the invention depicting a linked multiple web structure where security web 15 is communicatively linked to an additional security web 55 to form one combined security system. Security web 55 is comprised of a laptop 50, PDA 60, and a cellular phone 70. The communications link between security webs 15 and 55 is formed in this embodiment between PDA 40 of security web 15 and laptop 50 of security web 55. Various other ways of linking security webs 15 and 55 are possible in the context of the invention so long as at least one device from security web 15 is linked to at least one device in security web 55.

It is appreciated that the particular choices of devices shown in FIGS. 1a through 4 are exemplary only and that the invention could be implemented upon any combination of appropriately enabled RF communications devices.

Figure 5:
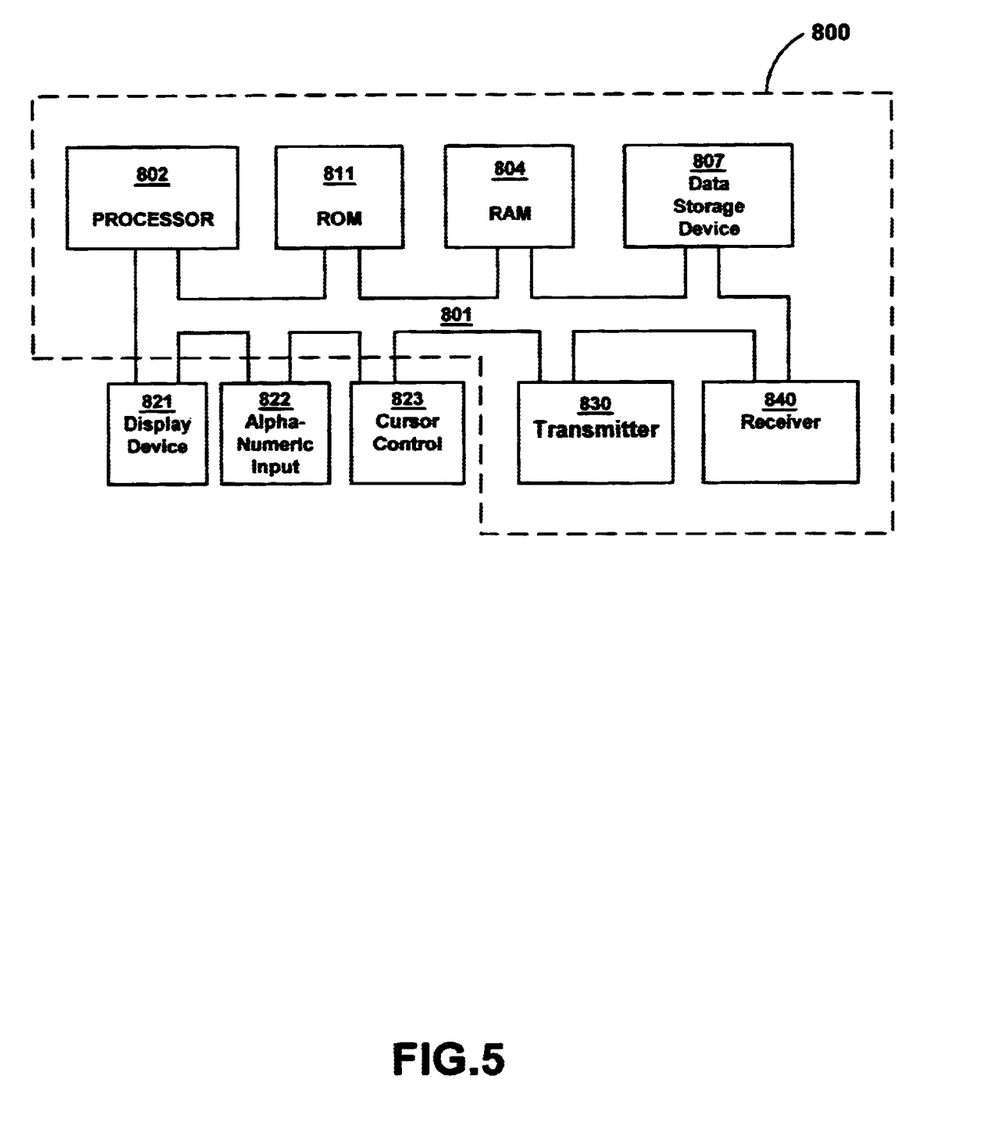
FIG. 5 illustrates an exemplary computer system upon which the communication functions of the various devices may be practiced.

FIG. 5 illustrates an exemplary configuration of a portable information device. (PID) 800 upon which the present invention may be implemented or practiced. It is appreciated that the PID 800 of FIG. 5 is exemplary only and that the present invention can operate upon a number of different information devices and computer systems, portable and stationary. PID 800 of FIG. 5 includes an address/data bus 801 for conveying digital information between the various components,,a central processor unit (CPU) 802 for processing the digital information and instructions, a main memory 804 comprised of random access memory (RAM) for storing the digital information and instructions, a read only memory (ROM) 811 for storing information and instructions of a more permanent nature. In addition, PID 800 may include a data storage device 807 (e.g., a magnetic, optical, floppy, or tape drive). A transmitter 830 and a receiver 840 are additionally included within PID 800. It should be noted that the client program for performing the functions of the invention can be stored either in main memory 804, data storage device 807, or in an external storage device. Devices which may be coupled to PID 800 include a display device 821 for displaying information to a PID user, an alphanumeric input device 822 (e.g., a keyboard), and a cursor control device 823 (e.g., mouse, trackball, light pen, etc.) for inputting data and selections.

In an embodiment of the invention, a computer-usable medium, such as ROM 811, RAM 811, and/or data storage device 807 of FIG. 5, has stored thereon computer-readable code for causing a computer, such as processor 802 of FIG. 5, or portable information device, e.g. PID 800 described in FIG. 5, to effect a security web upon multiple such devices. The code enables multiple devices to respond as authorized members of a security web such that each device acts as a co-monitoring device within the security web by first transmitting an identifiable RF signal at regular time intervals from each device of the security web, next searching for the transmitted RF signal from each device by each device of the security web, then determining a non-authorized loss of proximity from the web of at least one device of the security web, and lastly upon the non-authorized loss of proximity, providing for at least one of the devices of the security web to initiate an event.

In an embodiment of the invention the components of PID 800 of FIG. 5 are resident within a device, such as a PDA, for which security protection is desired, and the computer-readable code described above is downloaded to a computer-usable medium within the device so to allow it to respond as a device within a security web.

In another embodiment of the invention, a device such as PID 800 has the computer-readable code described above stored on a computer-usable medium within the device a priori, and then this device is attached to a second device, such as a cellular phone, for which security enablement is desired.

Various embodiments of the invention as a method for effecting a security system upon multiple portable information devices are shown in FIGS. 6 through 9 and are described below.

Figure 6:
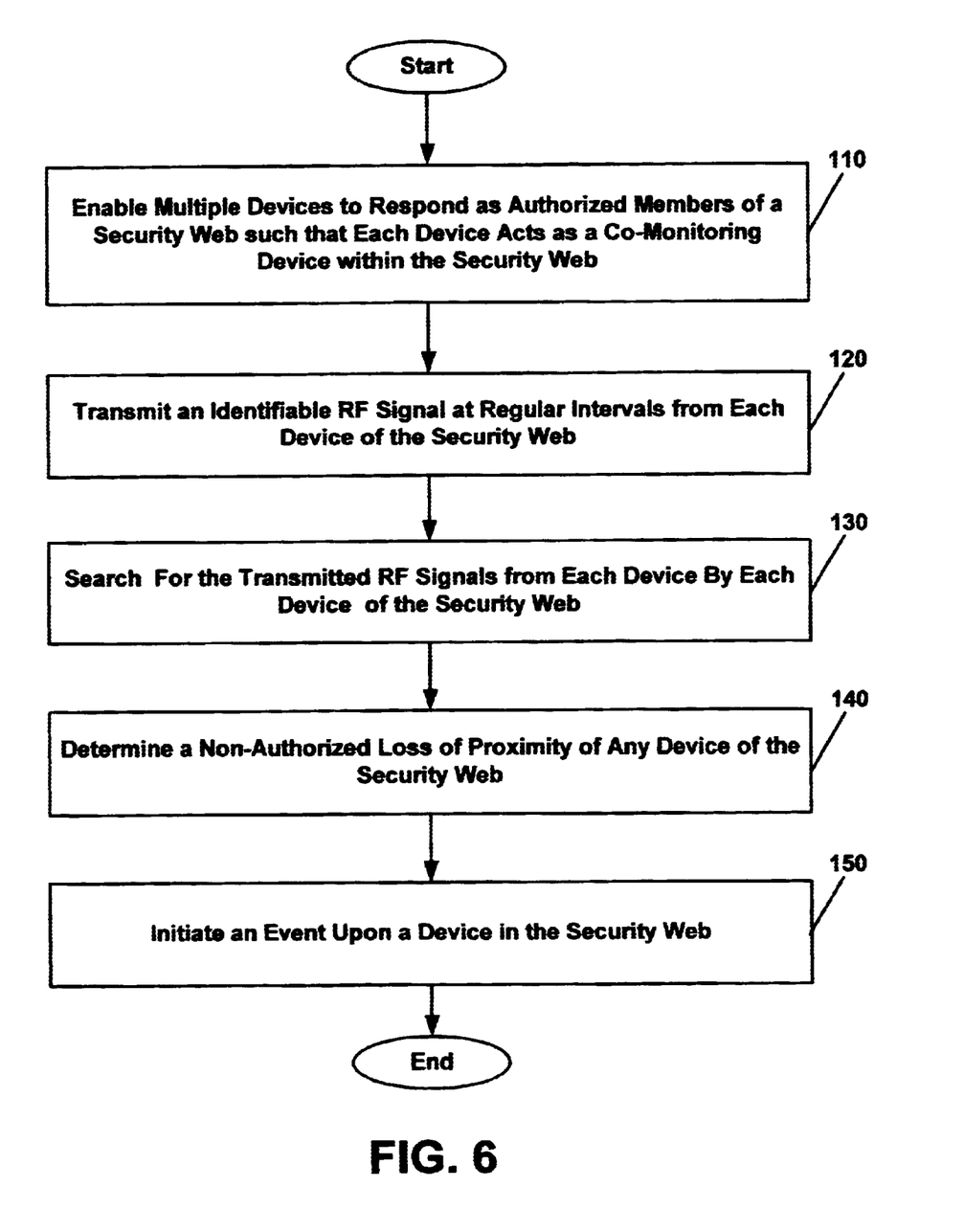
FIG. 6 is a flow diagram of a method for effecting a security system upon multiple portable information devices in accordance with an embodiment of the invention.

FIG. 6 is a flow diagram of a method for effecting a security system upon multiple information devices in accordance with an embodiment of the invention.

The method of FIG. 6 begins at step 110 wherein multiple devices are enabled to respond as authorized members of a security web such that each device acts as a co-monitoring device within the security web. The devices may be portable or stationary and include PDA's, laptop computers, desktop computers, servers, pagers, cellular phones, modems, other peripheral devices and other personal electronic devices comprising gaming devices, digital cameras, mobile access devices, digital camcorders and mp3/walkman players which have or may be augmented to have the computing and RF signal transmission, detection, and receiving capabilities necessary to be enabled as a co-monitoring device within a security web based on RF communications.

In step 120 each device within the security web transmits an identifiable RF signal at regular or time varying intervals. The signals transmitted may be unique to each device or may be common among a group of devices. The signal may be analog or digital. The transmission at regular or time varying intervals implies that the signal shall be repeated on a continuing basis so to be detectable over a period of time by other similarly enabled units. The time intervals may vary based on the number of devices being monitored, for the reduction of power consumption, and for the accommodation of other system communication parameters. This step includes in an exemplary embodiment the manner of transmission of signals employed in the Bluetooth wireless protocol wherein a rapid frequency hopping scheme and transmission of data in packets is employed.

Next in step 130 of FIG. 6 each device searches for the transmission signal of every other device within the security web. The mode of searching employed is variable so to accommodate the various RF communications and wireless protocols that may be employed. As example, an embodiment incorporating the Bluetooth protocol may include the various Bluetooth communications modes of ACTIVE, STANDBY, PAGE, PAGE SCAN, INQUIRY, INQUIRY SCAN, SNIFF, HOLD and PARK.

In step 140 the security web determines whether a non-authorized loss of proximity of any device from the web has occurred. The manner for making this determination is variable based on user input. Different logic may be employed, for example, based on different threat of loss circumstances and different combinations of devices being secured. The parameters for determining a loss of proximity may be variable. In example a non-receipt of a transmission signal may be determinative of a loss of proximity, or receipt of a signal whose strength is less than a prescribed minimum may be determinative of a loss of proximity.

Lastly in step 150, upon the determination of a non-authorized loss of proximity, an event is initiated upon at least one device in the security web. The event initiated may vary widely with examples being the activation of audio and visual alarms, the activation and deactivation of user pre-determined devices, and the transmission of communications to a device outside of the security web.

Figure 7:
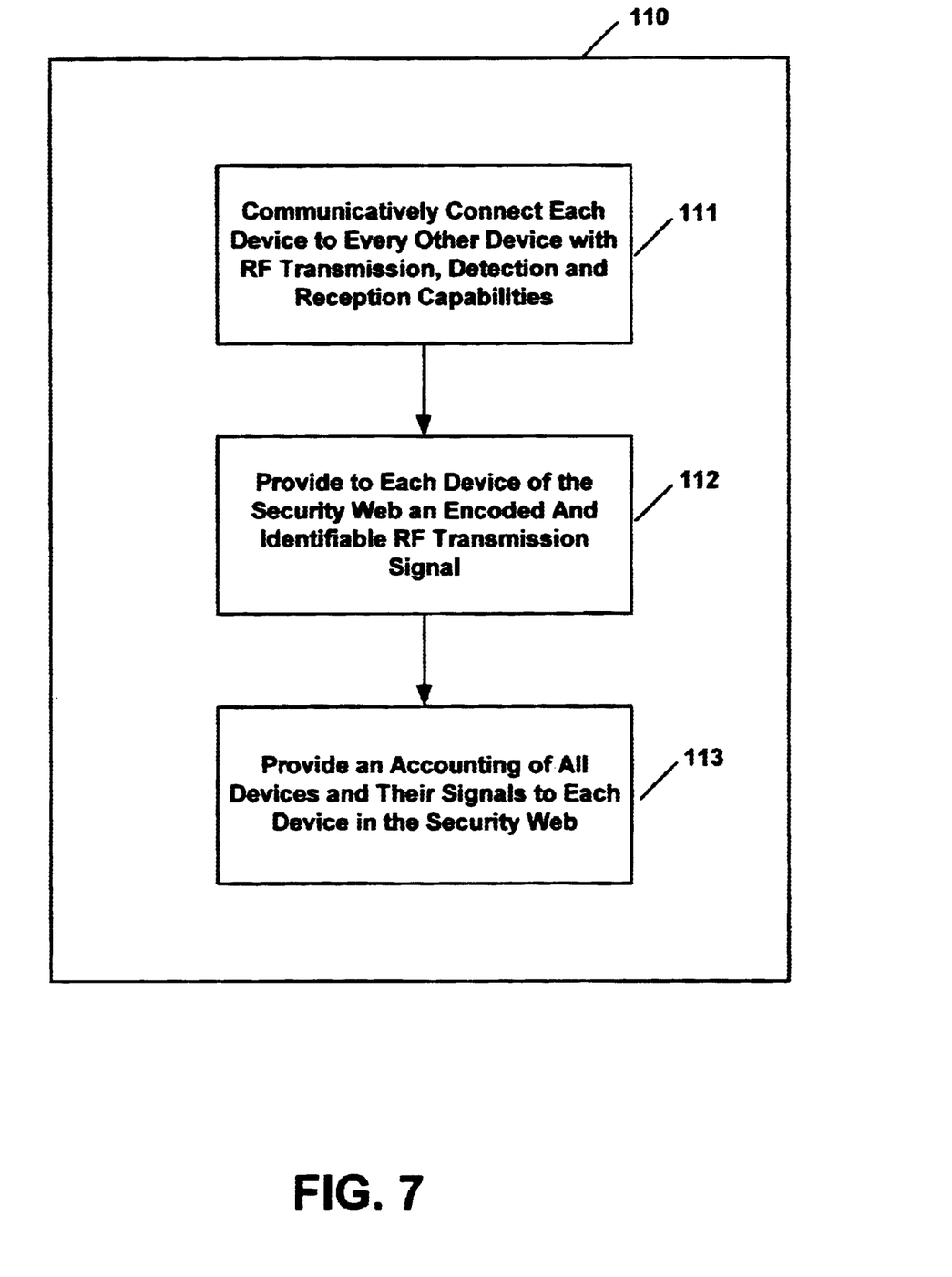
FIG. 7 is a flow diagram further depicting the device communication enablement within the method for effecting a security system upon multiple portable information devices in accordance with an embodiment of the invention.

FIG. 7 is a flow diagram which describes an exemplary method further describing the enabling step 110 of FIG. 6.

The enabling step 110 is first comprised of step 111, communicatively connecting each device to every other device with RF transmission, detection, and reception capabilities. This step may be initiated by one device to each of every other device, or may be initiated by multiple devices to each of every other device. The detection capability may vary with the type of signal being transmitted and the type of communications protocol that may be employed. An embodiment of the invention incorporating the Bluetooth protocol may include the approach where one device initiates the communications with all other devices at the Link Management level. In example a Bluetooth master would create ACL (Asynchronous Connectionless) connections between itself and each Bluetooth slave that is intended to be part of the security web.

Next in step 112, each device within the security web is provided an encoded and identifiable RF transmission signal. An embodiment incorporating the Bluetooth protocol may utilize particular attributes of the Bluetooth header data, such as the Bluetooth device address and Bluetooth clock data, for providing the identifiable RF transmission signal Finally in step 113 of FIG. 7, each device is provided an accounting of all the devices within the security web. The accounting provides for all devices to be made aware of all other devices in the security web and their transmission signals. This step allows for the security web's membership to be established and maintained as devices indicate intent to leave the web and as other devices join the security web.

Figure 8:
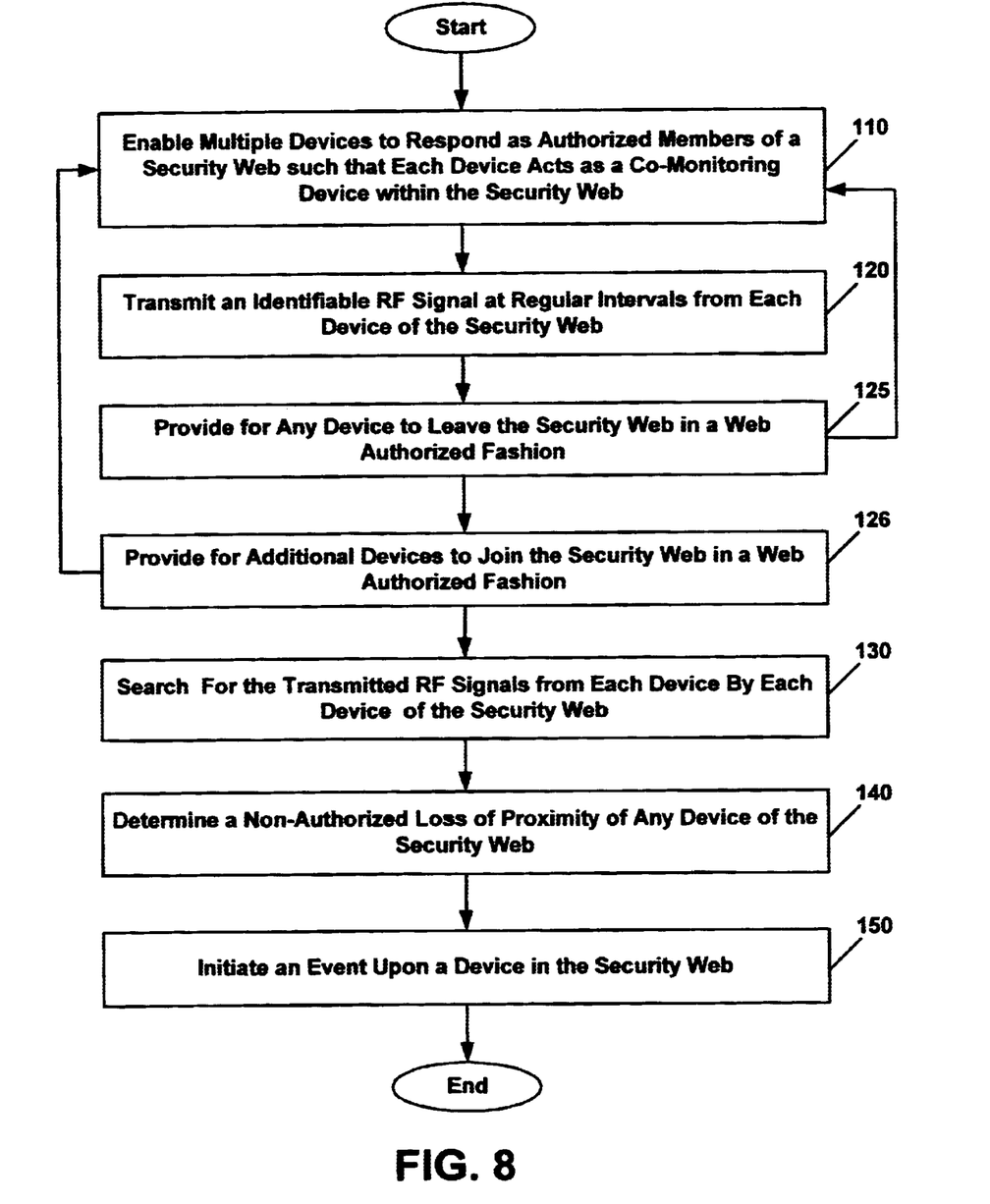
FIG. 8 is a flow diagram of a method for effecting a security system upon multiple portable information devices additionally providing for the addition and subtraction of devices to the security web in accordance with an embodiment of the invention.

FIG. 8 is a flow diagram of another embodiment of the invention wherein the method for effecting a security system upon multiple information devices further provides for devices to be added and/or subtracted from the security web in a web authorized fashion.

The method of FIG. 8 begins with steps enabling 110 and transmitting 120 as shown previously in FIG. 6, but then step 125 provides for any device to leave the security web in a web authorized fashion. The web authorized fashion is variable based on user input. The approach may be as simple as the entry of a password upon the device wishing to be removed from the security web. Upon the removal of a device from the security web, the method returns to step 110 for enabling each device to serve as a co-monitoring device for every other device.

Step 126 follows step 125 and provides for additional devices to join the security web in a web authorized fashion. In example an access code may be issued to all devices whose security web membership has been pre-approved. The transmission of the access code by a new device to any member device of the security web would then provide in step 110 for the new device to be added to the security web's accounting for future monitoring by all the web devices.

The method of FIG. 8 then continues as in FIG. 6 with the search step 130, determine step 140, and event initiate step 150.

Figure 9:
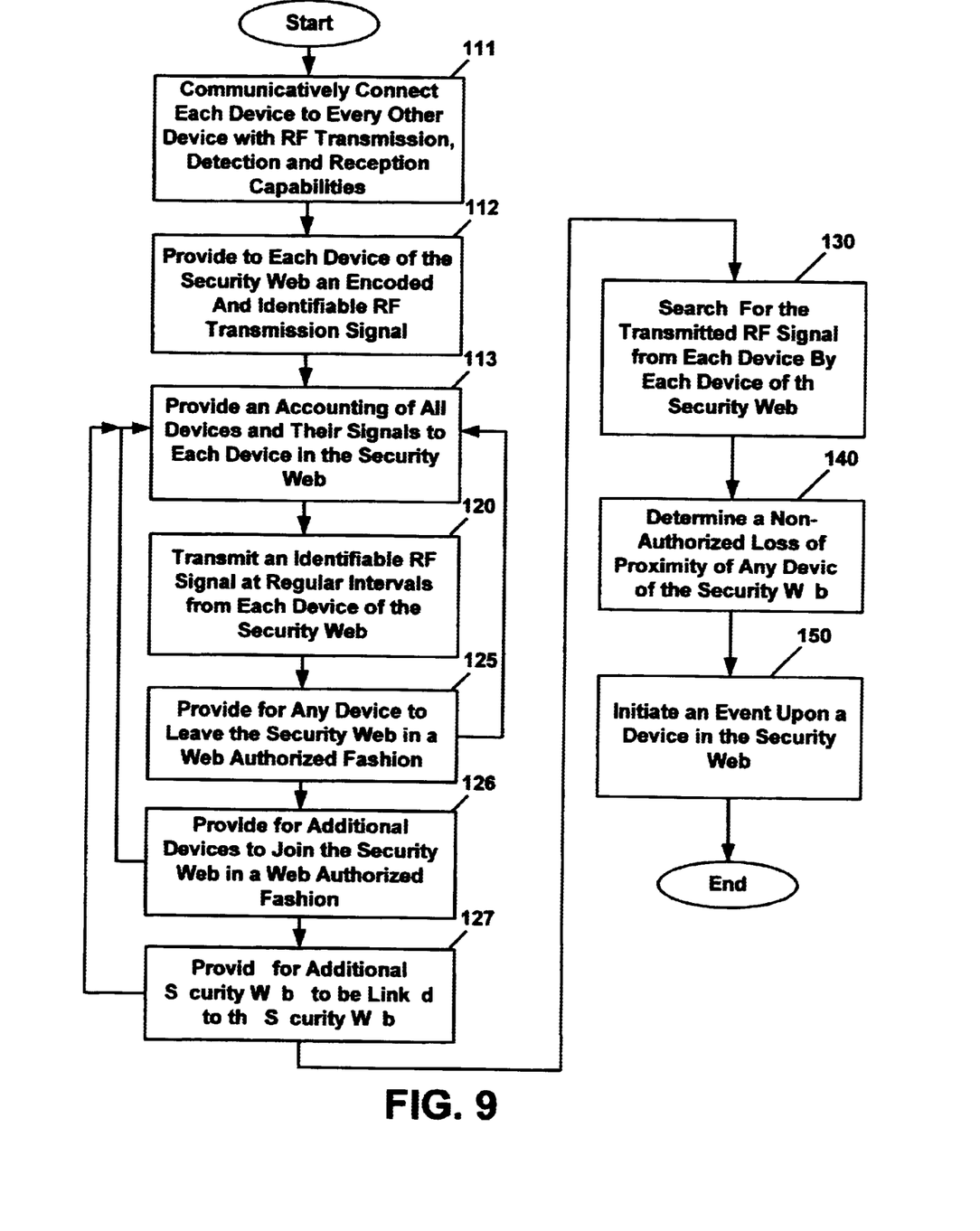
FIG. 9 is a flow diagram of a method for effecting a security system upon multiple portable information devices where the system provides for the addition and subtraction of devices to the security web and additionally provides for the linking of an additional security web to the first security web in accordance with an embodiment of the invention.

FIG. 9 is a flow diagram of another embodiment of the invention wherein the method for effecting a security system upon multiple information devices additionally provides for additional security webs to be linked to a first security web in a web authorized fashion as well as for providing for devices to be added and/or subtracted from the security web in a web authorized fashion.

The method begins with steps communicatively connecting 111, providing signal 112, and providing an accounting 113 as shown previously in FIG. 7 in further comprisement of enabling step 110 shown in FIG. 6. The method continues with the transmitting step 120 as shown previously in FIG. 6 and FIG. 8, and then with steps 125 and 126 of FIG. 8, providing for any device to leave the security web in a web authorized fashion and providing for a device to join the security web in a web authorized fashion.

Step 127 of FIG. 9 follows step 126 and provides for additional security webs to join the first security web in a web authorized fashion. This, in example, may be allowed through the provision of an access code by the security web to other security webs. In an embodiment incorporating the Bluetooth protocol, this step may be accomplished by allowing one piconet to communicatively link to a second piconet.

Upon the addition of a security web, the method returns to step 113 for providing an accounting to each device for each device to serve as a co-monitoring device for every other device. The method then continues as in FIG. 6 and FIG. 8 with the search step 130, determine step 140, and event initiate step 150.

Bluetooth Embodiments

In one embodiment of the invention multiple Bluetooth enabled portable information devices comprising laptop computers, PDA's, cellular phones, and pagers are communicatively connected to every other device within a Bluetooth piconet. Each device periodically polls for the presence of all the other devices in the piconet and if the signal from any device is not detected by any other device in the piconet then all devices sound an alarm. Additionally any device which loses contact with all other devices of the piconet displays the owners name, address, and telephone number and then locks itself from further use until such time as a password is entered into the device.

In a variation of the previous embodiment, each of multiple Bluetooth enabled PID's poll for every other device within the piconet, but herein, when the signal from one device is undetected by every other device in the piconet, then an alarm is sounded on all devices. This embodiment allows for the security system to be spread over a larger distance to the limiting case where a single communications chain is effected over the multiple devices. In that case a loss of proximity between any two devices would activate a security event on one or multiple devices.

In another embodiment of the invention multiple Bluetooth enabled information devices poll for other devices provided with a unique and identifiable signal. Upon one device determining proximity of itself to at least one other device having the unique and identifiable signal, one or both devices are activated for additional functionality. Upon subsequent loss of proximity, the devices are deactivated for the additional functionality.

Figure 10:
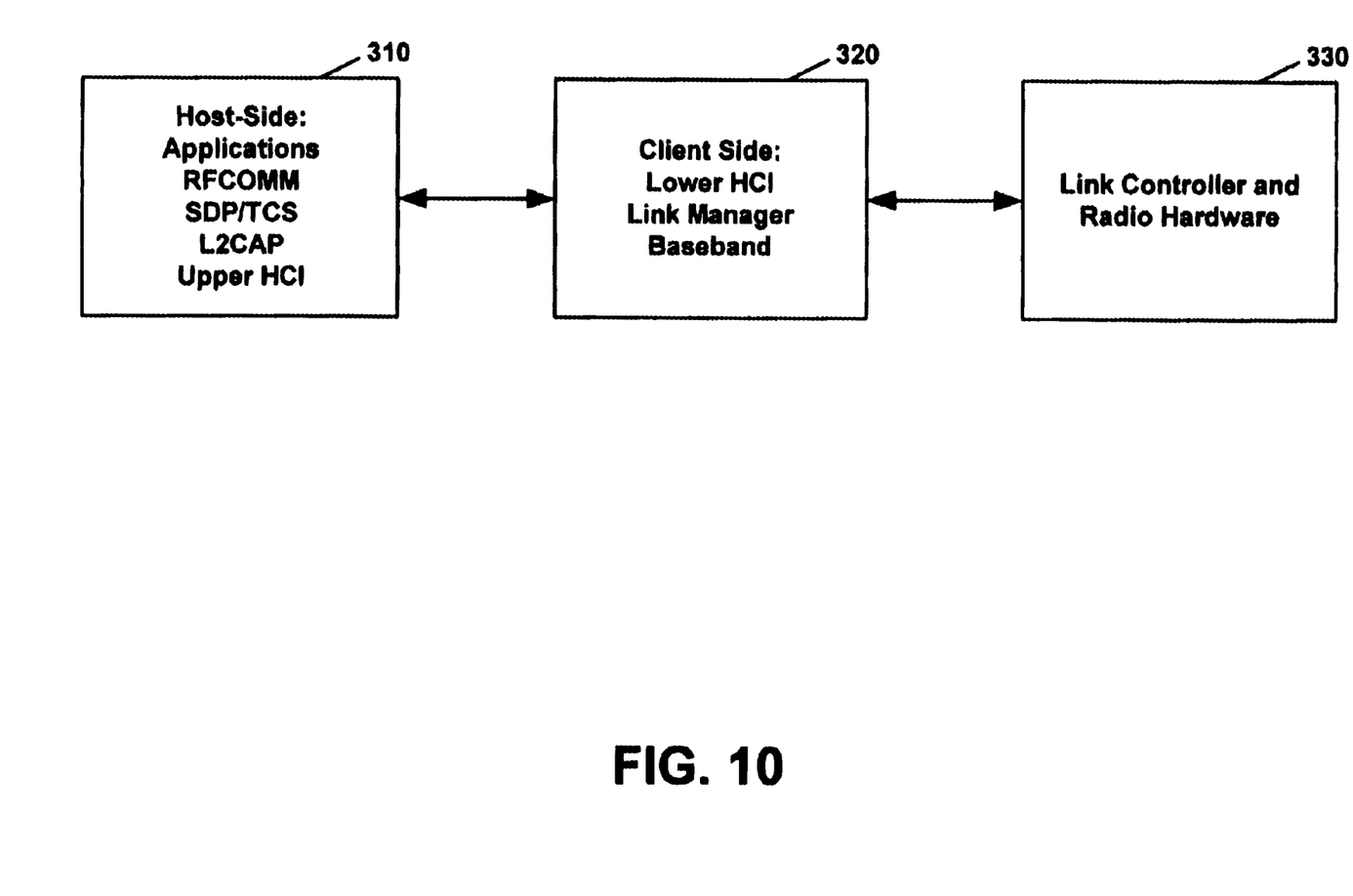
FIG. 10 is a block diagram depicting a dual processor architecture of the Bluetooth communications protocol.

Within those embodiments of the invention incorporating the Bluetooth protocol, a dual processor architecture may be employed on each communications link within the piconet. FIG. 10 shows a block diagram of such an architecture. In FIG. 10 a host side processor 310 and a client side processor 320 (which also may be referred to as a host controller side processor) share the Bluetooth communications functions of the piconet communications between the devices. The client side processor 320 additionally communicates with a link controller and radio hardware unit 330. In this architecture the client side processor maintains the Baseband communications function, Link Management function, and the lower HCI (Host Controller Interface) function. The host side processor maintains the Management Entity (ME) function, RFCOMM (Radio Frequency Communication) function, SDP (Service Discovery Protocol) function, TCS (Telephony Control Protocol) function, the L2CAP (Logical Link Control and Adaptation Protocol) function, and the upper HCI function as well as other miscellaneous applications.

At the Baseband level, present on the client side of the communication link, a supervision timer (supervisionTO) is used to monitor link loss. If a device doesn't receive any data packets that pass the HEC (Header Error Check) check and have the proper AM_ADDR (Medium Access Control Address), the device issues an error response. The supervisionTO value is set to work through hold and sniff periods, which are lower level device scanning modes provided for reducing device power consumption.

At the Link Management Level, present on the client side of the communication link, link quality detection is based upon miss-read data packets (bad PDU's_Protocol Data Units). If the Link Manager receives a PDU with an unrecognized OpCode, it respond with an appropriate reason code. If the maximum response time in the Link Manager is exceeded or if a link loss is detected at the Baseband level, the other Bluetooth device of that communications link concludes that the communications procedure has terminated unsuccessfully.

On the host side of the connection, detection of a poor or lost communications link occurs via the L2CAP function (or optionally the ME function), which is equipped to capture the appropriate error code and issue a response to the host side stack. An embodiment of the invention incorporates this Bluetooth logic such that the method uses the HCI Error Code CONNECTION TIMEOUT as an indicator of a link loss, and thus utilizes existing indicators already defined in the Bluetooth specification.

Exemplary Detailed Means for Enabling Embodiments Incorporating the Bluetooth Protocol Management of the Bluetooth connection occurs at the Baseband, Link Manager, and L2CAP level. The HCI interface provides a Connection Timeout message to the Host-Side system upon resend of the link supervision timeout. In a Dual-Processor Bluetooth architecture, the Baseband and Link Manager run on the client-side of the system, while L2CAP and ME functions reside on the host-side.

Baseband Link Monitoring

At the Baseband level, the Supervision timer (supervisionTO) is used to monitor link loss. If a device doesn't receive any packets that pass the HEC check and have the proper AM_ADDR, it will issue an error response up the stack.

A Baseband connection may break down due to several reasons, including a device moving out of range or a loss of power. The specification calls out for special monitoring of the link on both the master and the slave side to avoid possible collisions when the AM_ADDR is reassigned to another slave. The Baseband specification discusses this on page 126 of the 1.0b Core specification and section 10.11 of the baseband specification, as quoted below: "To be able to supervise link loss, both the master and the slave use link supervision timers, T supervision. Upon reception of a packet that passes the HEC check and has the correct AM_ADDR, the timer is reset. If at any time in Connection State, the timer reaches the supervisionTO value, the connection is reset. The same timeout value is used for both SCO (Synchronous Connection Oriented) and ACL (Asynchronous Connectionless) connections. The timeout period, supervisionTO, is negotiated at the LM (Link Manager) level. Its value is chosen so that the supervision timeout will be longer than hold and sniff periods. Link supervision of a parked slave will be done by unparking and re-parking the slave."

The supervisionTO value will work through hold and sniff periods with special settings upon entering those modes. This value is determined by an HCI command, though there is a default of 20 seconds.

Link Manager Link Monitoring

At the Link Manager Level, link quality detection is based upon miss-read packets (bad Protocol Data Units). If the Link Manager receives a PDU with an "unrecognized OpCode", it responds with "LMP_not_accepted" (Link Manager Protocol) with the reason code "unknown LMP PDU". The op code parameter that is echoed back is the "unrecognized OpCode". If the Link Manager receives a PDU with invalid parameters, it responds with "LMP_not_accepted" with the reason code "invalid LMP parameters".

If the maximum response time in the Link Manager of 30 seconds is exceeded or if a link loss is detected at the baseband level, the other Bluetooth device concludes that the procedure has terminated unsuccessfully. Bad LMP messages can be caused by errors on the channel or systematic errors at the transmit side. To detect the latter case the Link Manager will monitor the number of bad messages and disconnect if it exceeds a threshold.

L2CAP (or ME) Link Loss Handling

Detection of a poor link not only occurs on the client-side of the connection. L2CAP (or ME) is also equipped to capture the error code and issue a response to the stack.

If an L2CAP (or ME) link loss notification is received, the local RFCOMM entity is responsible for sending a connection loss notification to the port emulation/proxy entity for each active DLC (Data-Link Control) . Then all resources associated with the RFCOMM session should be freed. The appropriate action to take in the port emulation/proxy entity depends on the API on top. For example, for an emulated serial port (vCOMM), it would be suitable to drop CD, DSR and CTS signals (assuming device is a DTE (Data Terminal Equipment)).

Therefore, RFCOMM must require L2CAP to provide channels with maximum reliability, to ensure that all frames are delivered in order, and without duplicates. Should an L2CAP channel fail to provide this, RFCOMM expects a link loss notification, which should be handled by RFCOMM as described in Section 5.2.3.

Proposed Detection Method

This method proposed uses the HCI Error Code CONNECTION TIMEOUT as an indicator of a link loss. A proprietary scheme could easily implement a separate command, but this method utilizes existing indicators already defined in the specification. Below is an excerpt from the HCI Functional Specification, section 6.10 (page 749) of the Bluetooth 1.0b Core Specification.

CONNECTION TIMEOUT (0X08)

Note: This error code is used to indicate a reason for disconnection. It is normally returned in the Reason parameter of a Disconnection Complete Event. It is therefore called reason code in the following description.

The "Connection Timeout" reason code is sent by the Host Controller in an event when the link supervision timer (see reference 1) expires and the link therefore is considered to be lost. The link supervision timeout is set using Write_Link_Supervision_Timeout. The event that returns this reason code will most often be a Disconnection Complete Event (in the Reason parameter).

The event will be returned on both sides of the connection where one Disconnection Complete Event will be sent from the Host Controller to the Host for each Connection Handle that exists for the physical link to the other device. (It is possible that a link loss is detected during connection set up in the case of which the reason code would be returned in a Connection Complete Event.)"

HCI Settings of the Link Supervision Timeout

The HCI specification calls out two commands for reading and writing to the supervisionTO register. These are the Read_Link_Supervision Timeout and the Write_Link_Supervision Timeout.

The following excerpts are from the HCI functional specification section 4.7.43 and 4.7.44 respectively. They are located on pages 665 and 667 of the 1.0b Core specification. "Read_Link_Supervision_Timeout This command will read the value for the Link Supervision Timeout parameter for the device. The Link supervision timeout parameter is used by the master or slave Bluetooth device to monitor link loss if for any reason no Baseband packets are received from that Connection Handle for a duration longer than the Link Supervision Timeout the connection is disconnected. The same time-out value is used for both SCO and ACL connections for the device specified by the Connection Handle.

Note: The Connection_Handle used for this command must be the ACL connection to the appropriate device. This command will set the Link_Supervision_Timeout values for other SCO Connection_Handle to that device.

Note: Setting the Link_Supervision_Timeout to No Link Supervision Timeout (0x0000) will disable the Link Supervision Timeout check for the specified Connection Handle. This prevents the requirement for the master of the piconet to "unpark" and then "park" each of the Bluetooth Device every ~40 seconds. By using the No Link Supervision Timeout setting the scalability of the Park mode is not limited."
"Write Link_Supervision_Timeout This command will write the value for the Link Supervision Timeout parameter for the device. The Link supervision timeout parameter is used by the master or slave Bluetooth device to monitor link loss. If for any reason no Baseband packets are received from that Connection_Handle for a duration longer than the Link Supervision Timeout the connection is disconnected. The same time-out value is used for both SCO and ACL connections for the device specified by the Connection_Handle.

Note: The Connection_Handle used for this command must be the ACL connection to the appropriate device. This command will set the Link_Supervision_Timeout values for other SCO Connection_Handle to that device.

Note: Setting the Link_Supervision_Timeout to No Link Supervision Timeout (0x0000) will disable the Link Supervision Timeout check for the specified Connection Handle. This prevents the requirement for the master of the piconet to "unpark" and then "park" each of the Bluetooth Device every-40 seconds. By using the No Link Supervision Timeout setting the scalability of the Park mode is not limited."

Hence, a method and system for effecting a security system upon multiple portable information devices is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be pre-defined by the Claims appended hereto and their equivalents.

What is claimed is:

1. A method for effecting a security web upon multiple devices comprising the steps of:
    a) enabling multiple devices to respond as authorized members of a security web such that each device acts as a co-monitoring device within said web;
    b) transmitting an identifiable RF signal at regular time intervals from each said device of said web;
    c) searching for said transmitted RF signal from each said device by at least one said device of said web;
    d) determining a non-authorized loss of proximity from said web of at least one said device of said web; and
    e) upon said non-authorized loss of proximity, providing for at least one of said devices of said web to initiate an event.

2. The method of claim 1 wherein said step c) of searching for said transmitted RF signal is comprised of the step of:
    searching for said transmitted RF signal from each said device by each said device of said web.

3. The method of claim 1 wherein said step a) of enabling further comprises:
    providing for each device to communicatively connect to every other device, wherein each device has RF signal transmission, detection and reception capabilities; and
    providing to each device of said web an encoded and identifiable RF transmission signal, and providing an accounting of all said devices and said encoded and identifiable transmission signals of said devices to each said device.

4. The method of claim 1 further comprising the step of providing for each said device to leave said security web in a web authorized fashion.

5. The method of claim 1 further comprising the step of providing for at least one additional device to join said security web in a web authorized fashion.

6. The method of claim 1 wherein said step d) of determining a non-authorized loss of proximity further comprises determining a non-receipt of said RF signal of at least one said device by every other device of said web.

7. The method of claim 1 wherein said step e) of providing for at least one device to initiate an event further comprises providing for the deactivation of user pre-determined devices.

8. The method of claim 1 further comprising the step of providing for the merger of said security web with at least one additional security web.

9. The method of claim 1 wherein said steps of enabling, transmitting, and detecting incorporate the Bluetooth Protocol.

10. The method of claim 1 wherein said devices are portable information devices inclusive of PDA's, cellular phones, laptop computers, pagers and other personal electronic devices comprising gaming devices, digital cameras, mobile access devices, digital camcorders and mp3/walkman players.

11. A system for effecting a security web upon multiple devices comprising:
   a first device having RF signal transmission, detection, and receiving capability; and
   at least one additional device having RF signal transmission, detection, and receiving capability, wherein each said device is enabled to respond as an authorized member of a security web and act as a co-monitoring device within said web, transmits an identifiable RF signal at regular time intervals, determines a non-authorized loss of proximity from said web of at least one said device of said web, and upon said non-authorized loss of proximity, provides for the initiation of an event and wherein at least one said device searches for said transmitted RF signals from every other said device of said web and for signals from additional devices seeking to join said web.

12. The system of claim 11 wherein each said device searches for said transmitted RF signals from every other said device of said web and for signals from additional devices seeking to join said web.

13. The system of claim 11 wherein each said device is provided to communicatively connect to every other device, and wherein each device transmits an encoded and identifiable RF signal and maintains an accounting of all said devices and said encoded and identifiable transmission signals of said web.

14. The system of claim 11 wherein each said device is provided a method to leave said security web in a web authorized fashion.

15. The system of claim 11 wherein each device is provided a method to authorize additional devices to join said security web.

16. The system of claim 11 wherein each said device determines a non-authorized loss of proximity by determining a non-receipt of said RF signal of at least one said device.

17. The system of claim 11 wherein each device deactivates upon the non-authorized loss of proximity to the security web.

18. The system of claim 11 further comprising at least one additional security web communicatively linked with said security web.

19. The system of claim 11 wherein said devices incorporate the Bluetooth Protocol.

20. The system of claim 11 wherein said devices are portable information devices comprising PDA's, cellular phones, laptop computers, pagers and other personal electronic devices comprising gaming devices, digital cameras, mobile access devices, digital camcorders and mp3/walkman players.

21. A computer-usable medium having computer-readable code embodied therein for causing multiple computers to perform the steps of:
   a) enabling multiple devices to respond as authorized members of a security web such that each device acts as a co-monitoring device within said web;
   b) transmitting an identifiable RF signal at regular time intervals from each said device of said web;
   c) searching for said transmitted RF signal from each said device by at least one said device of said web;
   d) determining a non-authorized loss of proximity from said web of at least one said device of said web; and
   e) upon said non-authorized loss of proximity, providing for at least one of said devices of said web to initiate an event.

22. The computer-usable medium of claim 21 wherein said step c) of searching for said transmitted RF signal is comprised of the step of:
   searching for said transmitted RF signal from each said device by each said device of said web.

23. The computer-usable medium of claim 21 wherein said step a) of enabling further comprises:
   providing for each device to communicatively connect to every other device, wherein each device has RF signal transmission, detection and reception capabilities; and
   providing to each device of said web an encoded and identifiable RF transmission signal, and providing an accounting of all said devices and said encoded and identifiable transmission signals of said devices to each said device.

24. The computer-usable medium of claim 21 further comprising the step of providing for each said device to leave said security web in a web authorized fashion.

25. The computer-usable medium of claim 21 further comprising the step of providing for at least one additional device to join said security web in a web authorized fashion.

26. The computer-usable medium of claim 21 wherein said step d) of determining a non-authorized loss of proximity further comprises determining a non-receipt of said RF signal of at least one said device by every other device of said web.

27. The computer-usable medium of claim 21 wherein said step e) of providing for at least one device to initiate an event further comprises providing for the deactivation of user pre-determined devices.

28. The computer-usable medium of claim 21 further comprising the step of providing for the merger of said security web with at least one additional security web.

29. The computer-usable medium of claim 21 wherein said steps of enabling, transmitting, and detecting incorporate the Bluetooth Protocol.

30. The computer-usable medium of claim 21 wherein said devices are portable information devices comprising PDA's, cellular phones, laptop computers, pagers and other personal electronic devices comprising gaming devices, digital cameras, mobile access devices, digital camcorders and mp3/walkman players.

* * * * *